N. J. MOLINARI.
SAFETY VALVE.
APPLICATION FILED JULY 16, 1918.

1,322,197.  Patented Nov. 18, 1919.

WITNESSES

Inventor
Nicholas J. Molinari,
By Richard B. Owen
Attorney

UNITED STATES PATENT OFFICE.

NICHOLAS J. MOLINARI, OF BROOKLYN, NEW YORK.

SAFETY-VALVE.

1,322,197.  Specification of Letters Patent.  Patented Nov. 18, 1919.

Application filed July 16, 1918. Serial No. 245,212.

*To all whom it may concern:*

Be it known that I, NICHOLAS J. MOLINARI, a citizen of the United States, residing at Brooklyn, in the county of Kings and State of New York, have invented certain new and useful Improvements in Safety-Valves, of which the following is a specification.

This invention relates to fluid controlling valves and aims to provide safety means which will preclude the usual operation of the valve thereby preventing the average person from opening the valve when it is required to have the same closed, or from closing the valve when it is desired to have the same remain open.

The invention provides a valve of the type embodying a rotating plug which is free from an operating handle but which is of such construction as to admit of an operating device of special formation being fitted thereto when it is desired to operate the valve either to open or close the same.

The drawing illustrates a preferred embodiment of the invention, however, it is to be understood that in adapting the same to meet different conditions, various changes in form, proportion, and minor details of construction may be resorted to without departing from the nature of the invention as claimed hereinafter.

In the drawings:—

Corresponding and like parts are referred to in the following description and indicated in the several views of the drawing by like reference characters.

Figure 1:
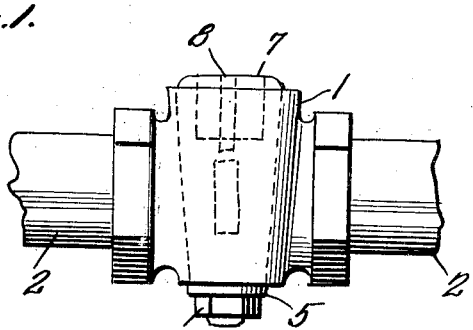
Figure 1 is a view in elevation of a valve embodying the invention.
Figure 2:
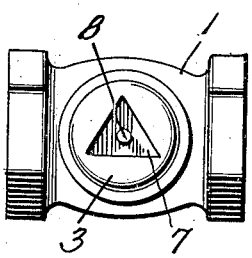
Fig. 2 is a top plan view thereof.
Figure 3:
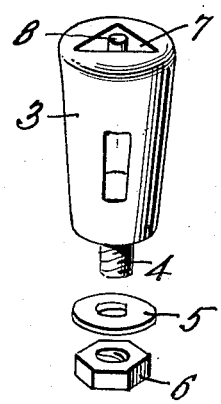
Fig. 3 is a perspective view of the turning plug and the washer and nut coöperating therewith.

The valve comprises a casing 1 which may be of any desired formation and which is indicated as provided with two coupling ends to which sections of pipe are attached. The casing 1 is provided with a tapering opening in which is fitted a plug valve 3 in which is formed an opening in the usual manner constituting a passage through which the fluid passes in a manner well understood when the valve is open. As indicated the smaller end of the plug valve 3 is provided with a threaded stem 4 upon which is adapted to be placed a washer 5 and a nut 6. The larger end of the valve 3 projects slightly beyond the casing and is made rounding. A recess 7 is formed in the larger end of the plug valve 3 and is of non-circular form in cross section, so as to provide for turning the valve when it is required to open or close the same. As indicated the recess 7 is of triangular form to receive an operating element of corresponding shape. To increase the difficulty of operating the valve a pin 8 is disposed within the recess 7 and constitutes a ward.

Figure 4:
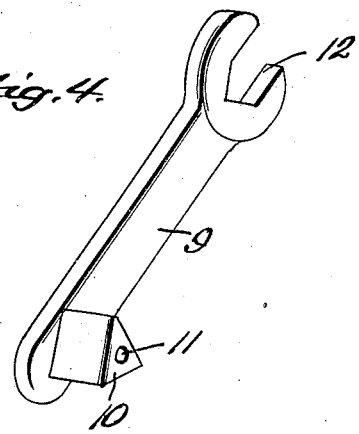
Fig. 4 is a detail view in perspective of means for operating the valve.

It will be understood that a valve constructed in accordance with this invention is devoid of operating means and requires a tool for operating the same. Fig. 4 indicates a tool for this purpose, the same comprising a bar 9 having a lug 10 at one end of a shape to fit snugly within the recess 7 so that upon operating the tool the valve plug 3 may be rotated into open or closed position or to any intermediate point. An opening 11 is formed in the lug 10 to receive the pin 8. The bar 9 constitutes a handle and to increase the utility thereof the end opposite that provided with the lug 10 is formed with an opening 12 constituting a wrench head.

The valve when adjusted to the required position cannot ordinarily be moved without the use of a tool substantially as indicated in Fig. 4, but of such formation as to fit within the recess 7. When it is required to operate the valve the lug 10 is introduced into the recess 7 and the bar or handle 9 is turned so as to move the valve in the required position either to open or close the same or to adjust it to any required position.

The foregoing description and the drawings have reference to what may be considerd the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

A safety valve comprising a casing, a turn plug having a transverse port fitted within the casing with one end of the plug projecting very slightly above the surface of the casing with the edge of said projecting portion rounded, and said end of the plug formed with a triangular recess arranged relative to the port so that a line drawn through one point of the recess and the center thereof will lie parallel to the port, a pin located centrally of said recess and anchored in the plug and extended to a point flush with the top surface of the plug, an operating member in the form of a bar, and a laterally extending triangular extension on one end of said bar adapted to snugly fit the recess of the plug so that when the bar is properly fitted it may lie parallel to the port to indicate the position thereof relative to the valve casing, said extension having a recess therein to wholly receive the pin.

In testimony whereof I affix my signature in presence of a witness.

NICHOLAS J. MOLINARI.

Witness:
T. P. ZEAMAN.